US012769909B2

(12) United States Patent
Lim et al.

(10) Patent No.: US 12,769,909 B2
(45) Date of Patent: Oct. 20, 2026

(54) TEMPERATURE CONTROL SYSTEMS AND METHODS FOR INTEGRATED CIRCUITS

(71) Applicant: Intel Corporation, Santa Clara, CA (US)

(72) Inventors: Teik Wah Lim, Bayan Lepas (MY); Rajiv Mongia, Portland, OR (US); Archanna Srinivasan, San Jose, CA (US); Mahesh A. Iyer, Fremont, CA (US)

(73) Assignee: Altera Corporation, San Jose, CA (US)

( * ) Notice: Subject to any disclaimer, the term of this patent is extended or adjusted under 35 U.S.C. 154(b) by 316 days.

(21) Appl. No.: 17/703,181

(22) Filed: Mar. 24, 2022

(65) Prior Publication Data

US 2022/0215147 A1 Jul. 7, 2022

(51) Int. Cl.
*G06F 30/32* (2020.01)
*G06F 30/3308* (2020.01)
(Continued)

(52) U.S. Cl.
CPC ............ *G06F 30/32* (2020.01); *G06F 30/343* (2020.01); *H03K 3/012* (2013.01);
(Continued)

(58) Field of Classification Search
CPC .. G06F 30/343; G06F 30/3308; G06F 30/337; G06F 30/34; G06F 30/373;
(Continued)

(56) References Cited

U.S. PATENT DOCUMENTS 4,616,173 A * 10/1986 Cook ..................... G01R 23/10
324/76.62
5,147,498 A * 9/1992 Nashimoto ........... C23C 14/541
216/60

(Continued)

FOREIGN PATENT DOCUMENTS

CN 103220897 A * 7/2013 ........... H01L 23/345
EP 0512009 A1 * 11/1922 ............. G06F 1/206

(Continued)

OTHER PUBLICATIONS

Texas Instrument, "LMT01 0.5 degree C Accurate 2-Pin Output Temperature Sensor with Pulse Count Interface", LMT01, SNIS189D, Jun. 2015, revised Jun. 2018, 36 pages. (Year: 2015).*

(Continued)

*Primary Examiner* — Phallaka Kik
(74) *Attorney, Agent, or Firm* — InventIQ Legal LLP; Steven J. Cahill

(57) ABSTRACT

An integrated circuit system includes a temperature sensor circuit that generates an output indicative of a temperature in an integrated circuit. The integrated circuit system also includes a temperature management controller circuit that compares the temperature indicated by the output of the temperature sensor circuit to a temperature threshold. The integrated circuit system further includes temperature reduction circuitry and/or design compilation techniques and partial or full reconfiguration that controls the temperature in the integrated circuit system. The temperature management controller circuit causes the temperature reduction circuitry to reduce the temperature in response to the temperature indicated by the output of the temperature sensor circuit exceeding the temperature threshold. The temperature sensor circuit, the temperature management controller circuit, and the temperature reduction circuitry may be implemented (Continued)

by soft logic circuits, hard logic circuits, or any combination thereof.

20 Claims, 8 Drawing Sheets

(51) Int. Cl.

| | |
|---|---|
| ***G06F 30/337*** | (2020.01) |
| ***G06F 30/34*** | (2020.01) |
| ***G06F 30/343*** | (2020.01) |
| ***G06F 30/373*** | (2020.01) |
| ***G06F 30/398*** | (2020.01) |
| ***H03K 3/011*** | (2006.01) |
| ***H03K 3/012*** | (2006.01) |
| *G06F 119/06* | (2020.01) |
| *G06F 119/08* | (2020.01) |

(52) U.S. Cl.
CPC ........ *G06F 30/3308* (2020.01); *G06F 30/337* (2020.01); *G06F 30/34* (2020.01); *G06F 30/373* (2020.01); *G06F 30/398* (2020.01); *G06F 2119/06* (2020.01); *G06F 2119/08* (2020.01); *H03K 3/011* (2013.01)

(58) Field of Classification Search
CPC ............... G06F 30/398; G06F 2119/08; G06F 2119/06; G06F 30/32; H01L 23/34; H03K 3/011; H03K 3/012; H03K 19/0008
USPC .... 716/133, 134, 136, 111, 106; 703/16, 18, 703/19; 326/32, 33, 41, 47, 101
See application file for complete search history.

(56) References Cited

U.S. PATENT DOCUMENTS

| | | | | |
|---|---|---|---|---|
| 5,664,201 | A * | 9/1997 | Ikedea | G06F 1/324 713/320 |
| 5,805,403 | A * | 9/1998 | Chemla | G06F 1/206 702/132 |
| 6,002,627 | A * | 12/1999 | Chevallier | G11C 5/143 327/512 |
| 7,216,064 | B1 | 5/2007 | Pippin | |
| 7,804,372 | B2 | 9/2010 | Nakatani | |
| 8,801,281 | B1 * | 8/2014 | Chan | G06F 1/20 374/170 |
| 9,148,910 | B1 * | 9/2015 | Mimran | H05B 1/023 |
| 9,261,889 | B1 * | 2/2016 | Lee | G05F 1/10 |
| 9,824,773 | B1 * | 11/2017 | Arabi | G06F 1/3275 |
| 9,996,059 | B2 | 6/2018 | Roth et al. | |
| 10,048,744 | B2 * | 8/2018 | Thomas | G06F 1/324 |
| 2003/0142724 | A1 * | 7/2003 | Barth | G01K 7/01 374/178 |
| 2003/0212474 | A1 * | 11/2003 | Pippin | G06F 11/3024 714/E11.018 |
| 2006/0006246 | A1 * | 1/2006 | Kim | F04D 27/004 62/178 |
| 2006/0161375 | A1 * | 7/2006 | Duberstein | G06F 1/3296 702/132 |
| 2008/0026503 | A1 * | 1/2008 | Ryan | G05D 23/20 438/54 |
| 2008/0174374 | A1 * | 7/2008 | Tozer | H03L 1/026 331/66 |
| 2010/0200357 | A1 * | 8/2010 | Okabe | F16D 48/066 192/30 W |
| 2013/0345892 | A1 * | 12/2013 | Lin | H03K 19/00369 700/299 |
| 2015/0194969 | A1 * | 7/2015 | Kawabe | G06F 1/3243 327/114 |
| 2015/0270254 | A1 * | 9/2015 | Risbud | H10D 89/601 257/76 |
| 2015/0288792 | A1 * | 10/2015 | Nayak | H04M 1/675 455/558 |
| 2015/0355651 | A1 * | 12/2015 | Balakrishnan | G06F 11/3031 700/299 |
| 2016/0266640 | A1 * | 9/2016 | Kurosawa | G06F 1/3296 |
| 2017/0075397 | A1 * | 3/2017 | Saeidi | G06F 1/324 |
| 2017/0111520 | A1 * | 4/2017 | Bowers | G06F 21/32 |
| 2017/0281010 | A1 * | 10/2017 | Saeidi | G06F 1/3296 |
| 2017/0364130 | A1 * | 12/2017 | Ho | G06F 1/3243 |
| 2018/0120166 | A1 * | 5/2018 | Naidu | G01K 1/026 |
| 2018/0232021 | A1 * | 8/2018 | Perchlik | G06F 1/206 |
| 2018/0275728 | A1 * | 9/2018 | La Monica | G05B 15/02 |
| 2019/0050147 | A1 * | 2/2019 | Koo | G11C 16/3418 |
| 2019/0057886 | A1 * | 2/2019 | Zhang | H10F 71/00 |
| 2019/0182915 | A1 * | 6/2019 | Hirochi | H01L 21/268 |
| 2019/0286200 | A1 * | 9/2019 | Ho | G06F 1/1618 |
| 2021/0104515 | A1 * | 4/2021 | Ma | H10D 89/811 |
| 2021/0109562 | A1 * | 4/2021 | Ragland | G06F 1/324 |
| 2021/0208811 | A1 * | 7/2021 | Kim | G06F 7/523 |
| 2022/0004688 | A1 | 1/2022 | Srinivasan et al. | |
| 2022/0113198 | A1 * | 4/2022 | Sheng | G03F 7/427 |
| 2022/0137686 | A1 * | 5/2022 | Kälvesten | G06F 1/3275 700/300 |
| 2022/0164011 | A1 * | 5/2022 | Sahu | G01K 3/005 |
| 2022/0205846 | A1 * | 6/2022 | Chen | H01L 21/67248 |
| 2022/0334000 | A1 * | 10/2022 | Judkins, III | G01K 3/005 |
| 2023/0108765 | A1 * | 4/2023 | Coimbra | H03K 17/145 374/178 |
| 2023/0152652 | A1 * | 5/2023 | Trikha | G06F 3/147 700/276 |
| 2023/0205658 | A1 * | 6/2023 | Duenas | G06F 11/3017 710/19 |

FOREIGN PATENT DOCUMENTS

| | | | | |
|---|---|---|---|---|
| EP | 1655591 | A1 * | 5/2006 | G01R 31/31908 |
| EP | 3287031 | A1 * | 2/2018 | A43B 17/006 |
| JP | 2006133228 | A * | 5/2006 | G01R 31/31908 |
| KR | 20040008251 | A * | 1/2004 | G01R 31/2849 |

OTHER PUBLICATIONS

Elder et al., "A CMOS Smart Temperature and Humidity Sensor with Combined Readout", Sensors (Basel), Sep. 16, 2014, 41 pages. ( Year: 2014).*

Korkian, et al., "Exploration of Ring Oscillator Based Temperature Sensors Network Accuracy on FPGA", The 19th CSI International Symposium on Computer Architecture & Digital Systems (CADS 2017), Dec. 2017, pp. 1-6.

* cited by examiner

TEMPERATURE CONTROL SYSTEMS AND METHODS FOR INTEGRATED CIRCUITS

FIELD OF THE DISCLOSURE

The present disclosure relates to electronic circuit systems, and more particularly, to temperature control systems and methods for integrated circuits.

BACKGROUND

In an electronic integrated circuit, the temperature of the integrated circuit is related to the frequency of data and/or clock signals in the integrated circuit. Some users of integrated circuits (ICs), such as field programmable gate arrays (FPGAs), have stringent use requirements, including the amount of time the ICs will be in use and the maximum temperatures that the ICs will generate while in use. Manufacturers of ICs often do not know in advance which of their ICs will experience the maximum environmental stresses (e.g., the highest temperatures for the longest periods of time), while being used in specific customer applications.

DETAILED DESCRIPTION

Figure 1:
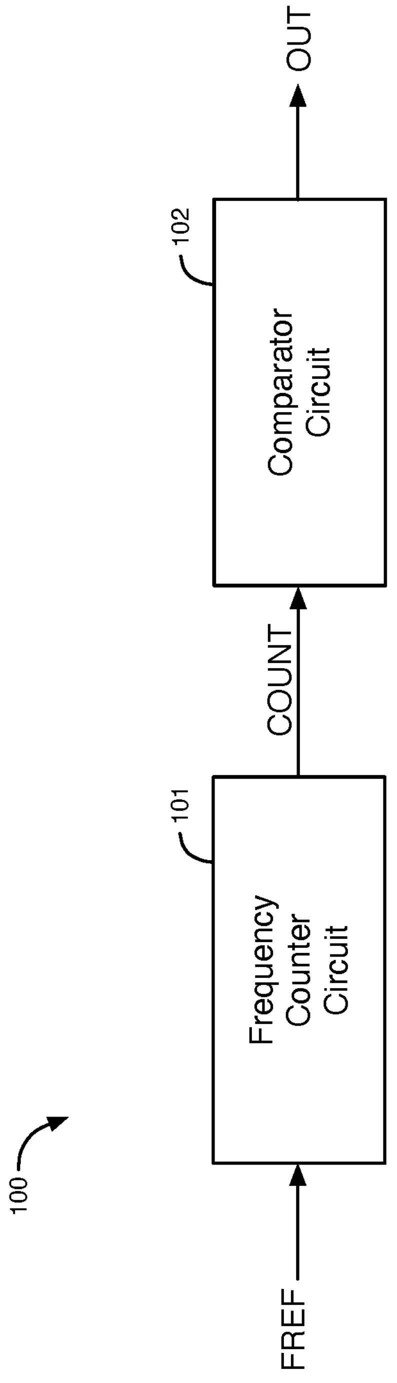
FIG. 1 illustrates an example of a temperature sensing logic circuit that can sense the temperature of a region of an integrated circuit.

In many types of integrated circuits (ICs), such as field programmable gate arrays (FPGAs), it may be important to accurately detect hotspots within the ICs. Detecting hotspots within an FPGA is challenging, because the core logic region of an FPGA typically does not contain thermal sensors. Without accurate temperature measurements in an FPGA, it is difficult to determine if the temperature of a hotspot exceeds a desired temperature threshold. Therefore, it would be desirable to determine the temperatures of hotspots in various regions of an IC, such as an FPGA, so that corrective action can be taken when the optimal temperatures for these regions are exceeded.

Because the core logic region of an FPGA is modular, an irregular structure, such as a thermal sensor, is not well-suited to be placed into the core logic region of an FPGA. On the other hand, placing thermal sensors in the core logic region of an FPGA in a regular pattern is unnecessary, because the thermal sensors would consume a significant amount of die area and may not be needed by all potential FPGA users. In addition, placing temperature sensing diodes into the core logic region would suffer from additional limitations, including requiring an analog-to-digital converter (ADC) for each set of diodes. Each ADC may have a limited distance support that could cause overhead if a significant number of temperature sensing diodes are required by a user design.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure discusses circuit systems that can be implemented in integrated circuit devices, including programmable logic devices such as field programmable gate arrays (FPGAs). As discussed herein, circuit systems may use hard logic and soft logic of an FPGA. As used herein, "hard logic" generally refers to circuits in an integrated circuit device (e.g., a programmable logic integrated circuit) that are not programmable by an end user. The circuits in the integrated circuit device that are programmable by the end user are considered "soft logic."

According to some examples disclosed herein, logic circuits in an integrated circuit (IC) are configured to function as temperature sensors that sense the temperatures in different regions of the IC. The IC may be a programmable logic IC or another type of IC. The temperature sensing logic circuits may be, for example, soft logic circuits, hard logic circuits, or a combination thereof. Each of the logic circuits generates an output that indicates the temperature of one of the regions in the IC. Each of the logic circuits includes transistors having timing characteristics that change with the temperature of the logic circuit. For example, the delay of the logic circuit may become faster when the temperature of the logic circuit increases.

A temperature management controller circuit detects temperature changes in the regions of the IC based on the outputs of the temperature sensing logic circuits. The temperature management controller circuit is able to detect the temperature changes in the regions of the IC based on the performance changes indicated by the temperature sensing logic circuits. The temperature sensing logic circuits may indicate hotspots in the IC. The temperature management controller circuit may compare the temperatures in regions of the IC to one or more temperature thresholds based on the outputs of the temperature sensing logic circuits. In response to one or more of the temperature sensing logic circuits indicating that the temperature in one or more regions of the IC has reached or exceeded one or more of the temperature thresholds, the temperature management controller circuit may initiate corrective actions, for example, powering down the IC or throttling down switching activity in the IC, such as disabling clock or data signal inputs to the IC. The temperature management controller circuit may be implemented, for example, using soft logic in a core logic region of the IC. The corrective actions may occur on the IC die or at the circuit board or package level. For example, the corrective actions may include enabling clock gating in the IC or power cycling the IC.

FIG. 1 illustrates an example of a temperature sensing logic circuit 100 that can sense the temperature of a region of an integrated circuit. Temperature sensing logic circuit 100 includes a frequency counter circuit 101 and a comparator circuit 102. The frequency counter circuit 101 and the comparator circuit 102 are in an integrated circuit (IC), such as, for example, a programmable logic IC (such as an FPGA), a microprocessor IC, or a graphics processing unit IC. The frequency counter circuit 101 and the comparator circuit 102 may, for example, be implemented by soft logic circuits, hard logic circuits, or any combination thereof, in an IC. A designer of the IC or a computer aided software design tool can, for example, create soft or hard logic instances of the temperature sensing circuit 100 at any desired locations within the IC during a design phase of the IC.

Each of the frequency counter circuit 101 and the comparator circuit 102 of Figure (FIG. 1 includes transistors. The temperature sensing logic circuit 100 leverages the fact that the delays of the transistors in logic circuits change with temperature. Specifically, in the context of FIG. 1, the delays of the transistors in the frequency counter circuit 101 change (e.g., increase or decrease) with the temperature of the frequency counter circuit 101. Also, the delays of the transistors in the frequency counter circuit 101 are highly dependent on the operating voltage of the frequency counter circuit 101. In temperature sensing logic circuit 100, the frequency counter circuit 101 generates a COUNT value in response to a reference periodic input signal FREF. The frequency counter circuit 101 adjusts (e.g., increases or decreases) the COUNT value at every rising edge of the reference periodic input signal FREF.

The frequency counter circuit 101 may, for example, have a minimum frequency (e.g., of 100 MHz). The COUNT value is provided in one or more signals from the frequency counter circuit 101 to the comparator circuit 102. The comparator circuit 102 compares the COUNT value to predetermined values that correspond to different temperatures to generate an output OUT. The predetermined values are determined (e.g., by a designer) by calibrating the frequency counter circuit 101 across different temperatures. The predetermined values may vary between integrated circuits (ICs) due to process variations between the ICs. The comparator circuit 102 causes the output OUT to have a value that indicates the temperature of the temperature sensing logic circuit 100 based on the comparison between the COUNT value and the predetermined values that correspond to different temperatures. The value of the output OUT of comparator circuit 102 can be used to determine if the temperature sensing logic circuit 100 is in a hotspot of the IC.

Table 1 below shows examples of the COUNT values generated by counter circuit 101 and the corresponding temperatures and values for the output OUT of comparator circuit 102 that are generated in response to the respective COUNT values in the respective rows using a first set of the predetermined values for counter circuit 101. The examples shown in Table 1 are derived using a reference frequency of 1 megahertz (MHz) for signal FREF.

TABLE 1

| COUNT | Temperature (° C.) | OUT |
|---|---|---|
| 100 | 25 | 00 |
| 150 | 50 | 01 |
| 200 | 100 | 10 |
| 250 | 125 | 11 |

The temperature sensing logic circuit 100 can achieve greater accuracy in the temperature determination using a lower reference frequency for signal FREF. For example, signal FREF may have a frequency of 100 kilohertz (kHz) to increase the granularity of the output OUT of the comparator circuit 102. Table 2 below shows additional examples of the COUNT values generated by counter circuit 101 and corresponding temperatures and values for the output OUT of comparator circuit 102 that are generated in response to the respective COUNT values in the respective rows using a second set of the predetermined values for counter circuit 101. The examples in Table 2 below are derived using a reference frequency of 100 kHz for signal FREF.

TABLE 2

| COUNT | Temperature (° C.) | OUT |
|---|---|---|
| 200 | 20 | 000 |
| 300 | 35 | 001 |
| 400 | 50 | 010 |
| 500 | 65 | 011 |
| 600 | 80 | 100 |
| 700 | 95 | 101 |
| 800 | 110 | 110 |
| 900 | 125 | 111 |

Figure 2:
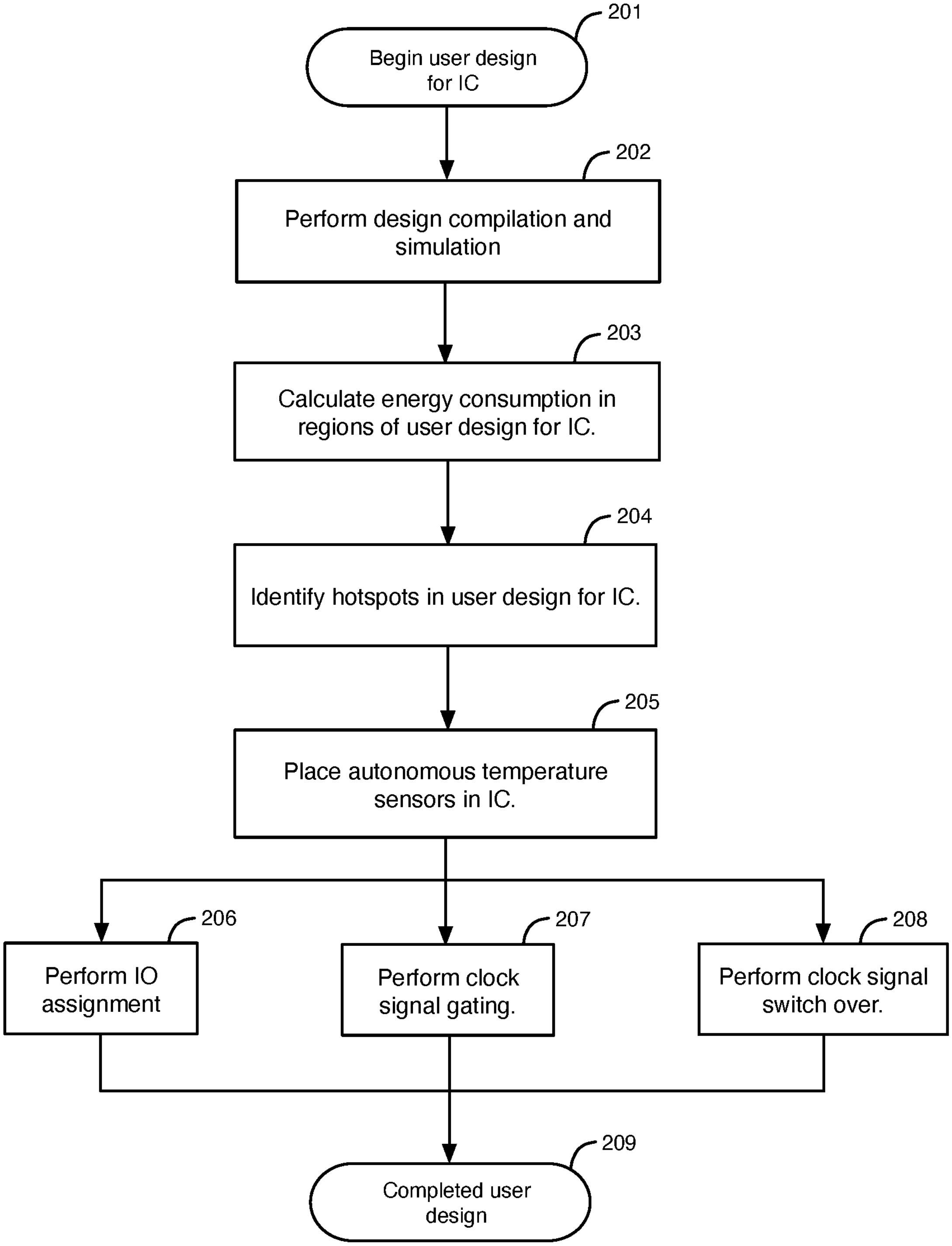
FIG. 2 is a flow chart that illustrates examples of operations that may be performed to implement temperature sensor placement and temperature monitoring in an integrated circuit (IC), such as a programmable logic IC.

FIG. 2 is a flow chart that illustrates examples of operations that may be performed to implement temperature sensor placement and temperature monitoring in an integrated circuit (IC), such as a programmable logic IC. The operations of FIG. 2 may, for example, be performed by computer-aided-design (CAD) tools operating on a logic design system. The logic design system can help a circuit designer design and test complex circuits for a system. When a circuit design is complete, the logic design system may be used to generate configuration data for electrically programming the appropriate programmable logic IC. The logic design system may be implemented on integrated circuit design computing equipment that may, for example, include one or more networked computers with processors, memory, mass storage, input/output devices, etc. The CAD tools may operate on the processors of the computing equipment. Memory in these computers or external memory and storage devices may be used to store instructions and data. In general, software and data may be stored in non-transitory computer readable storage media (e.g., tangible computer readable storage media).

In operation 201 of FIG. 2, a user design for an IC begins using CAD tools. The user design may also be referred to herein as a circuit design for the IC. In operation 202, the CAD tools perform design compilation and simulation of the user design for the IC. In operation 203, the CAD tools calculate the energy consumption in different regions of the user design for the IC during the simulation of the user design. In operation 204, the CAD tools identify hotspots in the user design for the IC, for example, based on the energy consumption in the different regions of the user design calculated in operation 203. In operation 205, the CAD tools place autonomous temperature sensors in selected regions of the IC. For example, the CAD tools may place a temperature sensing logic circuit 100 in each of the regions of the IC that were determined in operation 204 to be hotspots.

In operations 206-208, the CAD tools perform various functions to mitigate the hotspots in the user design for the IC. For example, in operation 206, the CAD tools may perform input/output assignment to reduce the temperature of one or more of the hotspots. Operation 206 may, for example, be performed at the external circuit board level or internally in the IC to assign or re-assign input/output signals to different external terminals (e.g., pads or bumps) of the IC to reduce the temperatures of one or more of the hotspots in the IC. In operation 207, the CAD tools may perform clock signal gating. The clock signal gating performed in operation 207 may, for example, involve gating off (i.e., blocking) one or more clock signals at selected locations in the IC to reduce the temperatures of one or more of the hotspots in the IC. In operation 208, the CAD tools may perform clock signal switch over. The clock signal switch over of operation 208 may, for example, be performed by reducing the frequency of one or more clock signals at selected locations in the user design to reduce the temperatures of one or more of the hotspots in the IC. The user design for the IC is then complete at operation 209.

Figure 3:
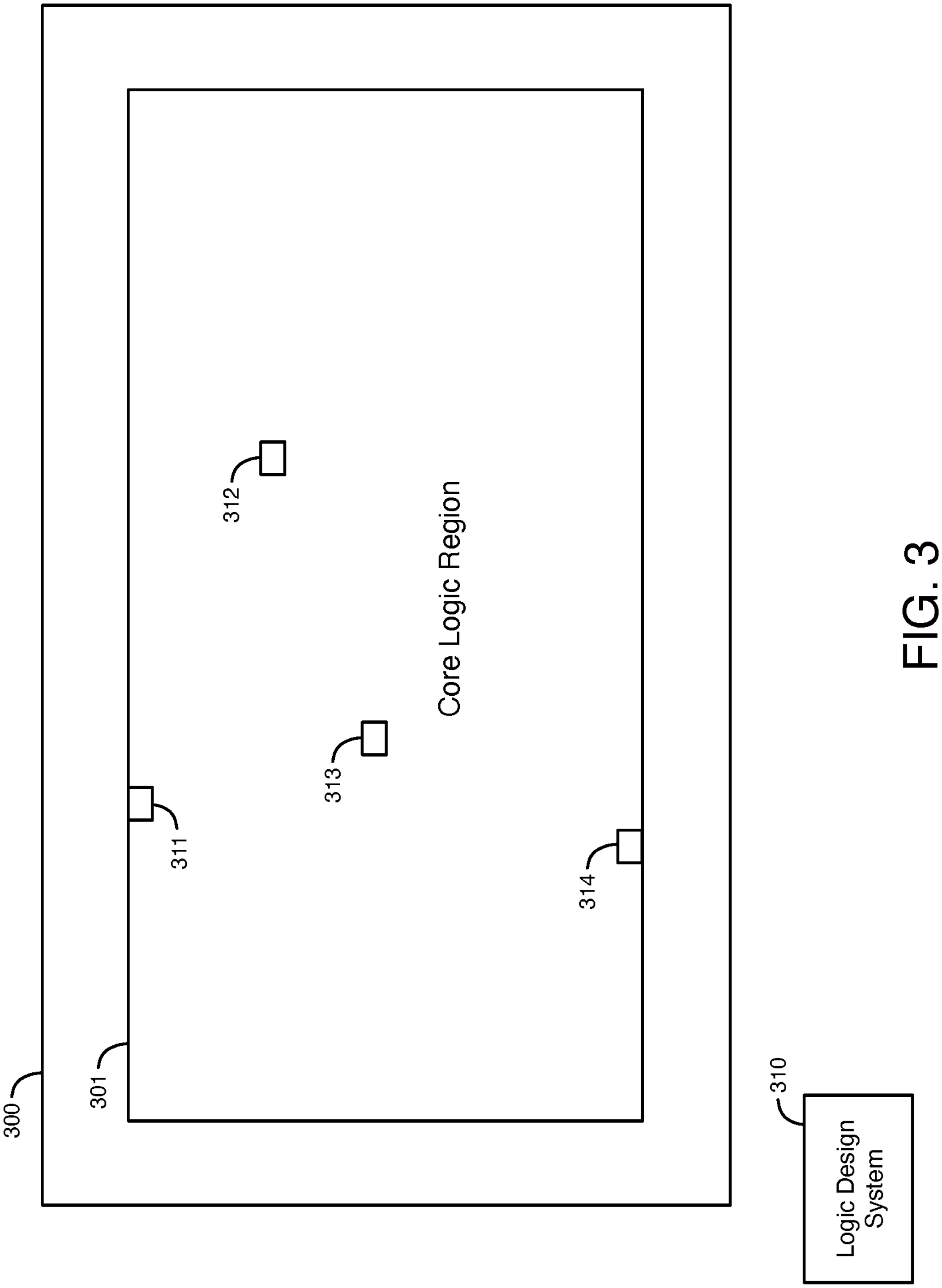
FIG. 3 illustrates examples of temperature sensor circuits that can be placed in various regions of an integrated circuit (IC) to sense the temperatures in these regions.

FIG. 3 illustrates examples of temperature sensor circuits that are placed in various regions of an integrated circuit (IC) 300 to sense the temperatures in these regions. In the example of FIG. 3, IC 300 includes a core logic region 301. If IC 300 is a programmable logic IC, core logic region 301 may include regions of programmable logic circuits, such as logic array blocks that are configurable to perform different functions. Core logic region 301 includes 4 temperature sensor circuits 311-314 as examples. Although, IC 300 may include any suitable number of temperature sensor circuits. Each of the temperature sensor circuits 311-314 may include an instance of the temperature sensing logic circuit 100 of FIG. 1. The CAD tools may, for example, place the temperature sensor circuits 311-314 in selected regions of the IC during operation 205 of FIG. 2. FIG. 3 also illustrates an example of the CAD tools on logic design system 310.

Figure 4:
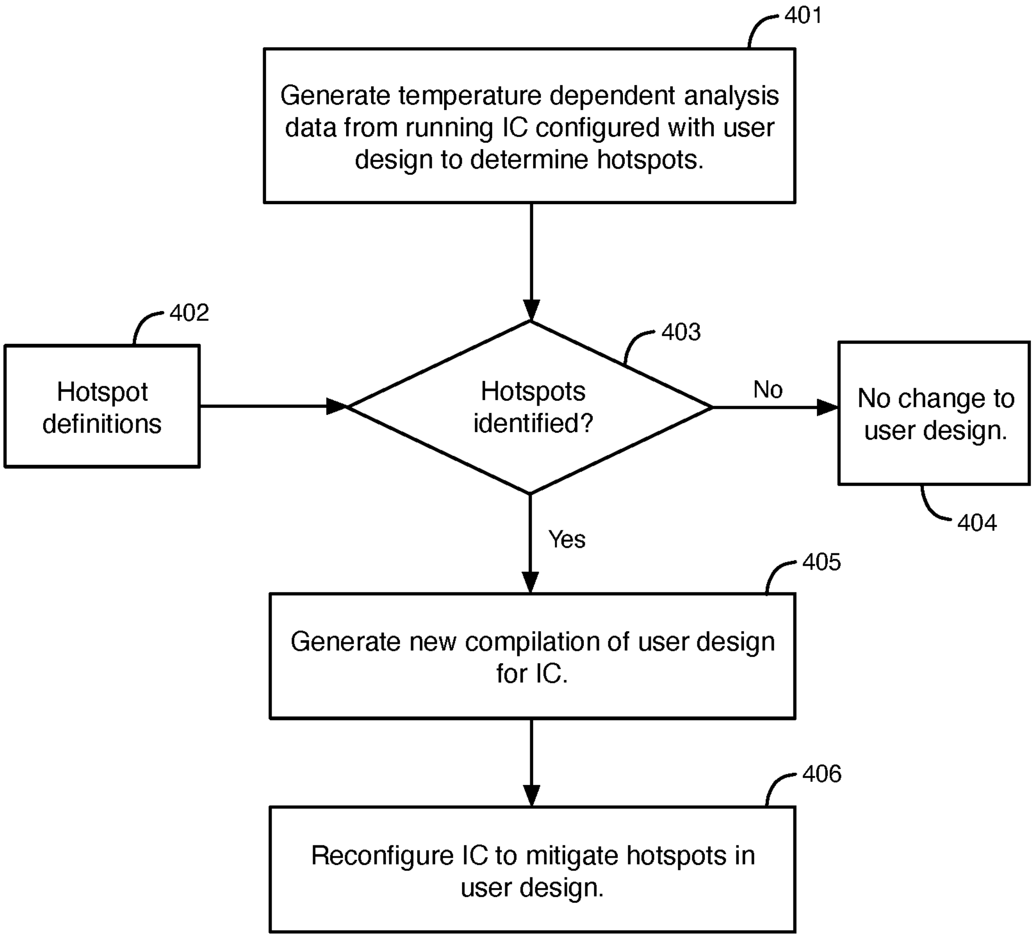
FIG. 4 is a flow chart that illustrates examples of operations that may be performed to reduce the temperatures of hotspots in a user design for an integrated circuit (IC).

FIG. 4 is a flow chart that illustrates examples of operations that may be performed to reduce the temperatures of hotspots in a user design for an integrated circuit (IC). As with the operations of FIG. 2, the operations of FIG. 4 may, for example, be performed by computer-aided-design (CAD) tools operating on a logic design system. In operation 401, temperature dependent analysis data is generated from running an integrated circuit (such as an FPGA) configured with a user design to determine the locations of hotspots in the user design. The temperature dependent analysis data may, for example, be generated in operation 401 by running the IC configured with the user design and analyzing the outputs of temperature sensor circuits that are located in different regions of the user design while the IC is operating.

In operation 402, hotspot definitions are provided to the CAD tools. The hotspot definitions may include, for example, a prediction of hotspots in the user design, one or more temperature thresholds that indicate definitions of hotspots in the user design, or user input indicating potential locations of hotspots in the user design. In decision operation 403, the CAD tools determine if hotspots in the user design for the IC have been identified based on the hotspot definitions received in operation 402 and based on the temperature dependent analysis data generated in operation 401. If no hotspots are identified by the CAD tools in operation 403, then the CAD tools determine no change is to be made to the user design for the IC in operation 404.

If at least one hotspot is identified by the CAD tools in operation 403, the CAD tools generate a new compilation of the user design for the IC in operation 405 that reduces the temperatures of the one or more hotspots. In operation 405, the CAD tools generate a new compilation of the user design that includes a new synthesis, a new placement, and a new routing of the user design on the IC. The new compilation of the user design generated in operation 405 may, for example, eliminate the one or more hotspots identified in operation 403 by reducing the energy consumption in these regions of the user design to reduce the temperatures of the one or more hotspots below a temperature threshold.

If the IC is a programmable logic IC, such as an FPGA, a new configuration bitstream is generated for the IC based on the new compilation of the user design generated in operation 405. The new configuration bitstream is then provided to the IC. In operation 406, the programmable logic IC is then reconfigured with the new configuration bitstream to mitigate the hotspots in the user design. In the reconfigured IC generated in operation 406, the hotspots that were identified in the IC in operation 403 are either eliminated, or the temperatures of these hotspots is significantly reduced (e.g., below one or more temperature thresholds).

Figure 5:
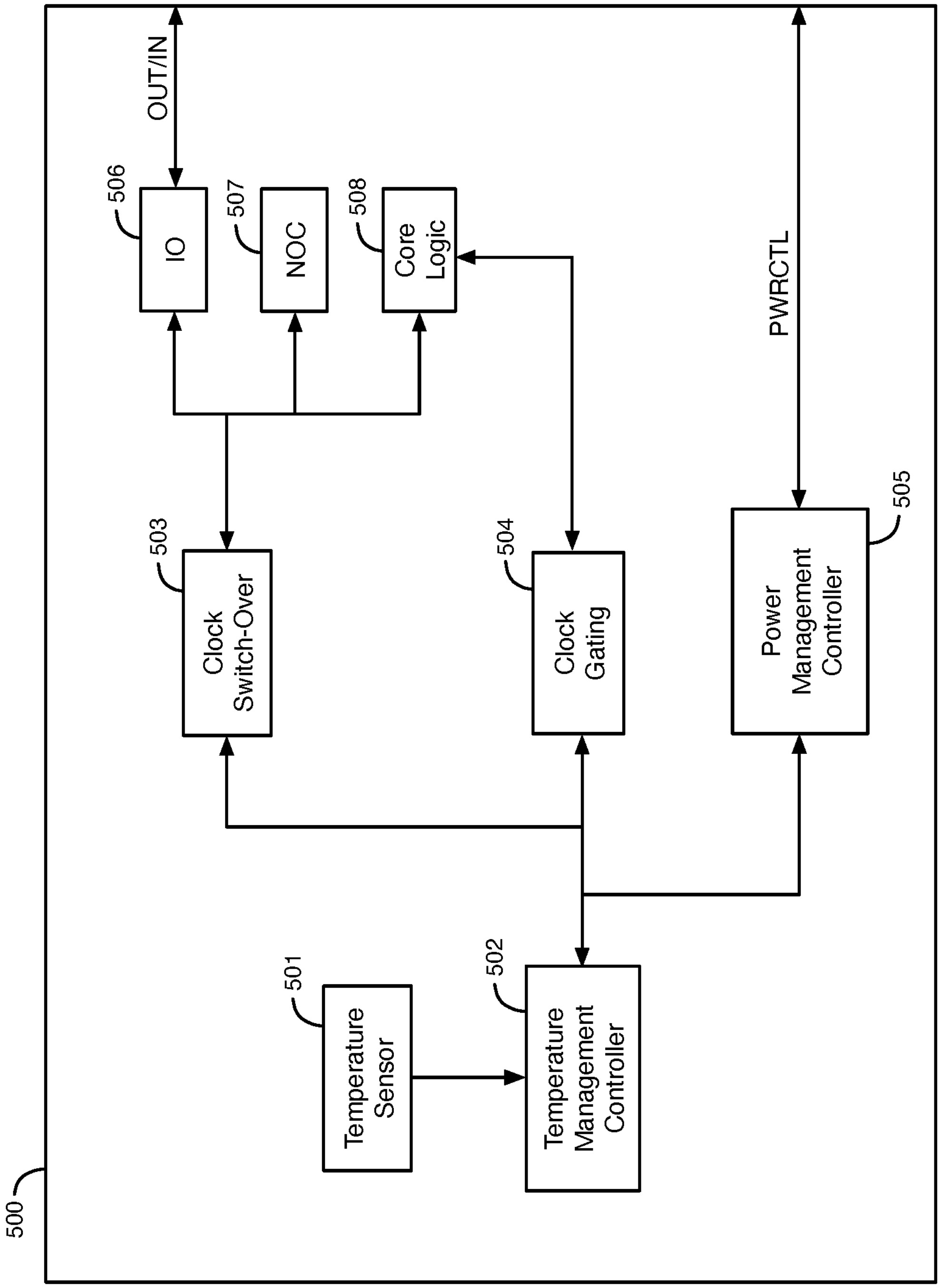
FIG. 5 is a diagram that illustrates an example of a portion of an integrated circuit (IC) that includes a temperature control and mitigation system.

FIG. 5 is a diagram that illustrates an example of a portion of an integrated circuit (IC) that includes a temperature control and mitigation system 500. The temperature control and mitigation system 500 of FIG. 5 includes a temperature sensor circuit 501, a temperature management controller circuit 502, a clock switch-over circuit 503, a clock gating circuit 504, a power management controller circuit 505, input/output (IO) circuitry 506, network-on-chip (NOC) circuitry 507, and core logic circuits 508. The temperature sensor circuit 501 may, for example, include the temperature sensing logic circuit 100. The temperature sensor circuit 501 sends an output to the temperature management controller 502 that indicates the temperature in a region of the IC, as disclosed herein, for example, with respect to FIG. 1. The IC of FIG. 5 may include additional temperature sensor circuits that are not shown in FIG. 5.

Figure 6:
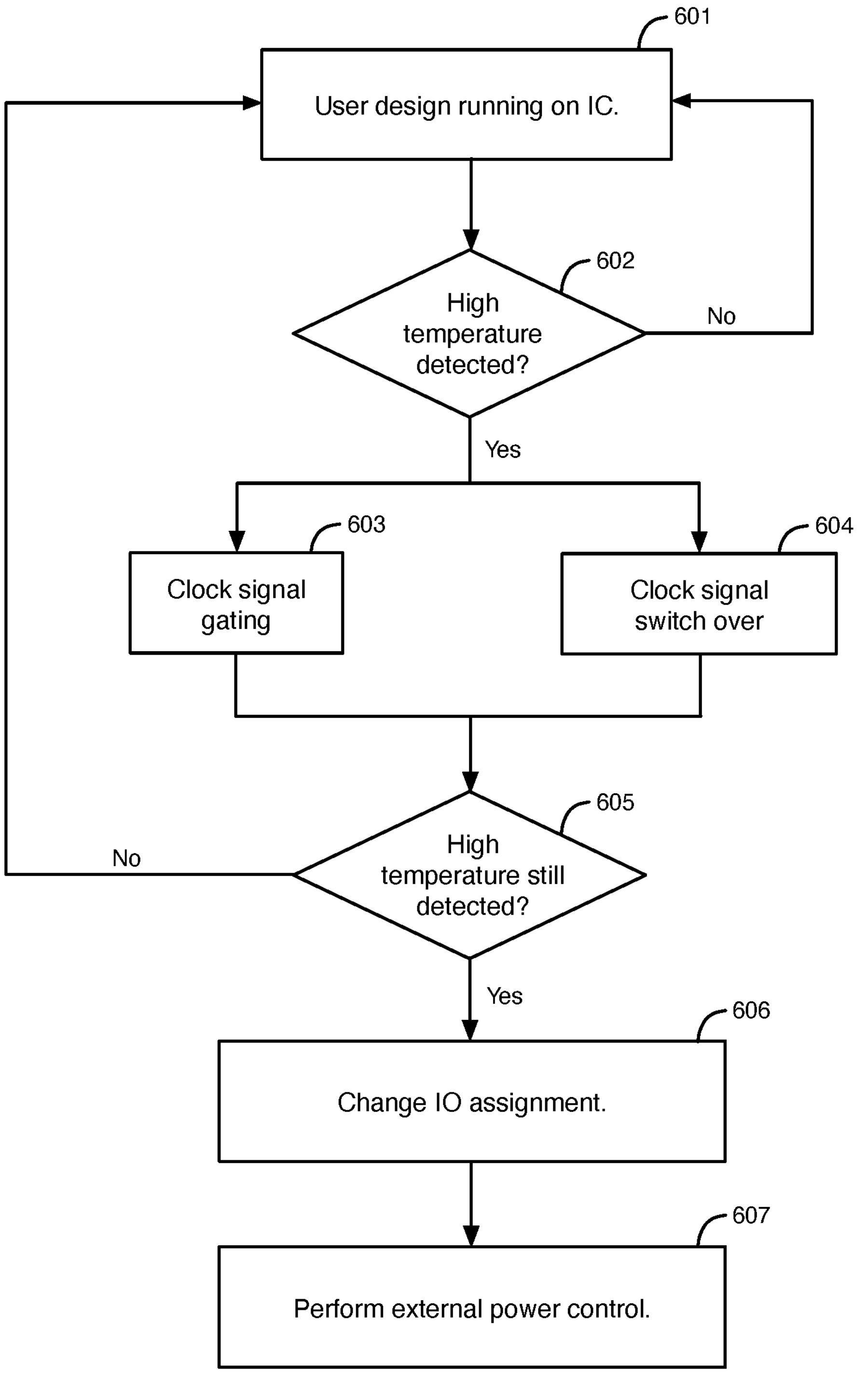
FIG. 6 is a flow chart that illustrates examples of operations that may be performed to reduce the temperatures of hotspots in a user design for an integrated circuit (IC) using the circuits shown in FIG. 5.

FIG. 6 is a flow chart that illustrates examples of operations that may be performed to reduce the temperatures of hotspots in a user design for an integrated circuit (IC) using the circuits shown in FIG. 5. In operation 601, a user design for an integrated circuit (IC) is running on the IC. The IC may be, for example, a programmable logic IC, such as an FPGA, that is configured according to the user design by a configuration bitstream generated by CAD tools on the logic design system.

In decision operation 602, the temperature management controller 502 can, for example, determine when the temperature indicated by the output of the temperature sensor circuit 501 has reached or exceeded a temperature threshold that is indicative of a hotspot. In response to the temperature management controller 502 determining that the temperature indicated by the output of the temperature sensor circuit 501 has reached or exceeded a temperature threshold in operation 602, the temperature management controller 502 can activate various temperature mitigation functions in the IC to reduce the temperature of the hotspot. For example, in response to the temperature management controller 502 determining that the temperature indicated by the output of the temperature sensor circuit 501 has reached or exceeded a temperature threshold, the temperature management controller 502 may activate the functionality of one or more of the clock switch-over circuit 503, the clock gating circuit 504, or the power management controller circuit 505 to reduce the temperature of the hotspot. If the temperature management controller 502 does not detect a high temperature in the output of the temperature sensor circuit 501 in operation 602, the user design continues to run on the IC without changes in operation 601.

Temperature management controller 502 may activate the functionality of clock switch-over circuit 503, clock gating circuit 504, or power management controller circuit 505 by sending activation signals to these circuits through the paths shown by arrows in FIG. 5. In operation 603, temperature management controller 502 sends activation signals to the clock gating circuit 504. In response to receiving the activation signals from temperature management controller 502, clock gating circuit 504 blocks one or more clocks signals from being provided to one or more logic circuits in the IC to reduce the temperature of the hotspot in operation 603. For example, clock gating circuit 504 may block one or more clock signals from being provided to one or more core logic circuits 508 to reduce the temperature of the hotspot. Blocking one or more of the clock signals may cause a subset of the core logic circuits 508 to stop operating.

In operation 604, temperature management controller 502 sends activation signals to the clock switch-over circuit 503. In response to receiving the activation signals from temperature management controller 502, clock switch-over circuit 503 changes the frequency (e.g., decreases the frequency) of one or more clock signals to reduce the temperature of the hotspot in operation 604. For example, clock switch-over circuit 503 may decrease the frequency of one or more clock signals that clock 10 circuitry 506. IO circuitry 506 may transmit output signals OUT to other devices outside of the IC of FIG. 5 and may receive input signals IN from other devices using the clock signals. As another example, clock switch-over circuit 503 may decrease the frequency of one or more clock signals that clock the NOC circuitry 507. NOC circuitry 507 may include programmable interconnects that transmit signals between circuits in the IC in response to one or more clock signals. As yet another example, clock switch-over circuit 503 may decrease the frequency of one or more clock signals that clock core logic circuits 508 in the IC of FIG. 5. For example, clock switch-over circuit 503 may decrease the frequency of one or more clock signals to slow down partial reconfiguration of the programmable logic circuits in the IC or may reset a phase-locked loop circuit to change the frequency of one or more clock signals.

In decision operation 605, the temperature management controller 502 determines if the temperature indicated by the output of the temperature sensor circuit 501 continues to be equal to or greater than the temperature threshold that is indicative of a hotspot. If operations 603-604 have not decreased the temperature of the hotspot below the temperature threshold, the temperature management controller 502 may then change the assignment of input/output (IO) signals to different external terminals (e.g., pins, pads, or bumps) of the IC in operation 606. For example, the temperature management controller 502 may transfer input and/or output signals from external terminals in a hotspot of the IC to external terminals in a cooler region of the IC in operation 606. If the temperature management controller 502 does not detect a high temperature in the output of the temperature sensor circuit 501 in operation 605, the user design continues to run on the IC without changes in operation 601.

In operation 607, temperature management controller 502 sends activation signals to the power management controller circuit 505. In response to receiving the activation signals from temperature management controller 502, power management controller circuit 505 controls load balancing within an integrated circuit (IC) package or circuit board that includes the IC of FIG. 5 in operation 607. The IC package or circuit board may include other integrated circuits (ICs) in addition to the IC of FIG. 5. In response to receiving the activation signals from temperature management controller 502, power management controller circuit 505 activates power control signals PWRCTL that are provided to the other ICs in the IC package or circuit board in operation 607. The other ICs in the IC package or circuit board may reduce their power consumption in response to sensing that the power control signals PWRCTL have been activated by the power management controller circuit 505. As a result, the temperature of the IC package or circuit board is reduced in response to the power consumption of the ICs being reduced.

Figure 7:
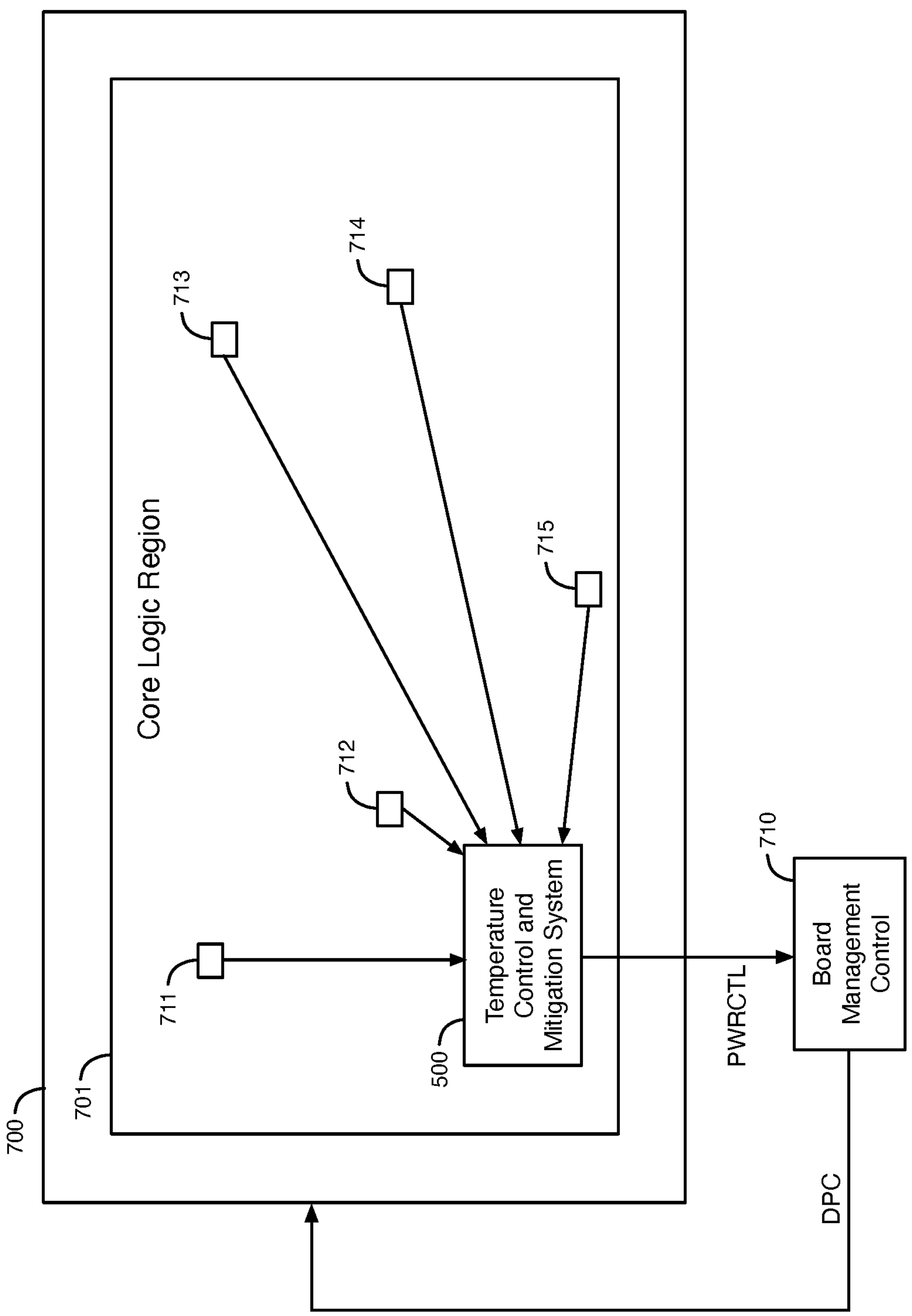
FIG. 7 is a diagram that illustrates an example of a core logic region of an integrated circuit that includes temperature sensors and the temperature control and mitigation system of FIG. 5.

FIG. 7 is a diagram that illustrates an example of a core logic region 701 of an integrated circuit 700 that includes temperature sensors 711-715 and the temperature control and mitigation system 500 of FIG. 5. Each of the 5 temperature sensors 711-715 may, for example, include an instance of the temperature sensing logic circuit 100 of FIG. 1. The temperature sensors 711-715 may, for example, be implemented by soft logic or hard logic circuitry in 5 regions of core logic region 701. In FIG. 7, the temperature control and mitigation system 500 monitors the outputs of the 5 temperature sensors 711-715 in the 5 different regions of the core logic region 701 of the IC 700. In the example of FIG. 7, the temperature control and mitigation system 500 may perform temperature reduction functions, including clock gating, clock switch-over, and external power management control, in response to the temperatures indicated by the outputs of the 5 temperature sensors 711-715.

The temperature control and mitigation system 500 may activate the power control signals PWRCTL in response to any one or more of the temperature sensors 711-715 indicating a hotspot in IC 700. The power control signals PWRCTL are provided from IC 700 to board management control system 710. In response to board management control system 710 sensing that the power control signals PWRCTL have been activated, board management control system 710 may activate device power control signals DPC. In response to the device power control signals DPC being activated by the board management control system 710, IC 700 may power off and then power on again (i.e., perform a power cycle). Board management control system 710 may power cycle other ICs in the IC package or on the circuit board using the power control signals DPC.

The temperature sensors, such as temperature sensors 711-715, can also be used in performance tuning for critical timing paths in the IC 700. At locations in the critical timing paths where the temperatures indicated by the temperature sensors are not at a temperature threshold indicative of a hotspot, IR drop (i.e., voltage drop) can be reduced, which causes the critical timing paths to run at a higher voltage and to have a higher performance as a result. Critical timing path areas in the IC can also be designed to have lower logic circuit utilization to improve performance.

Figure 8:
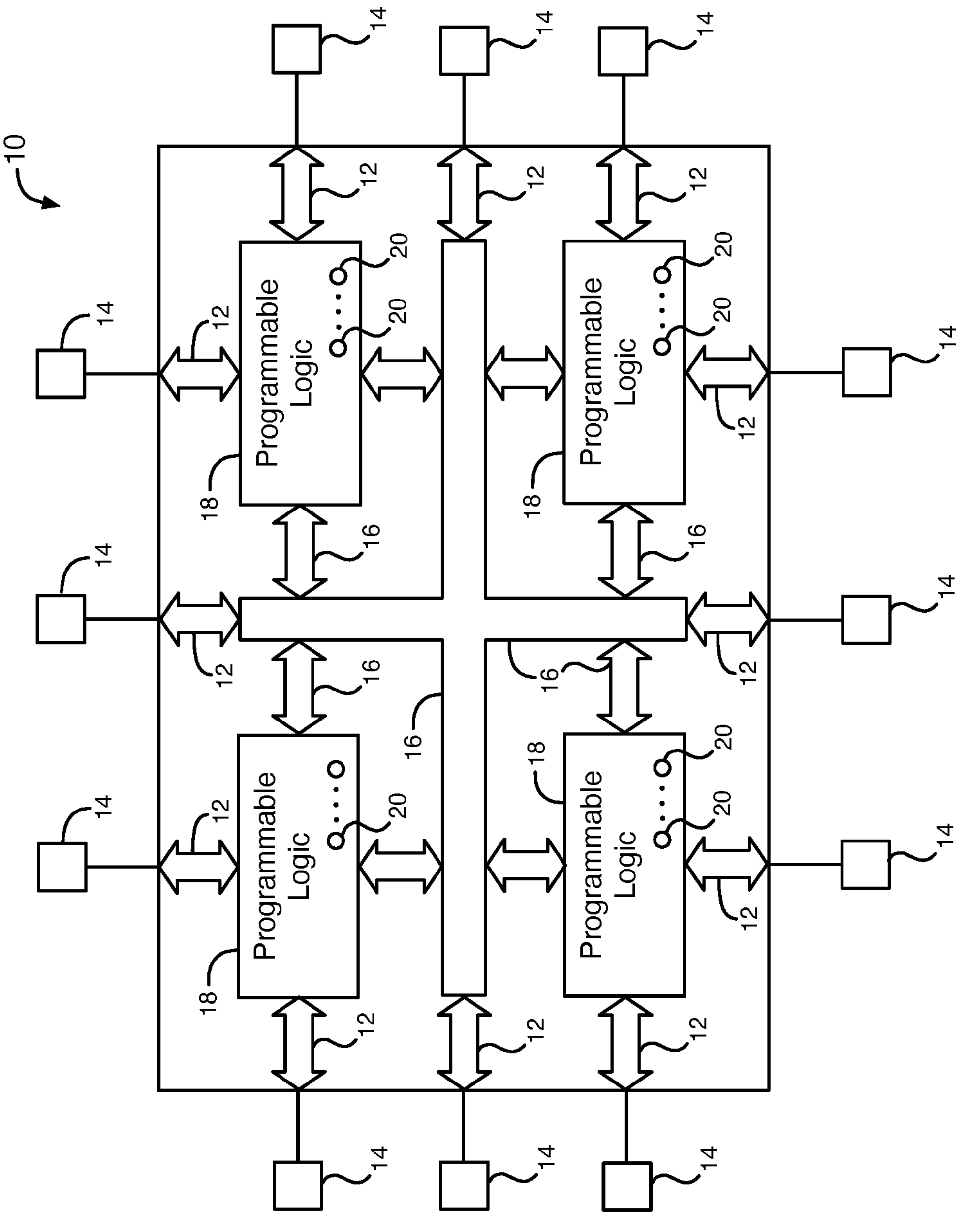
FIG. 8 is a diagram of an illustrative programmable logic integrated circuit (IC) that may include any of the circuitry shown in FIGS. 1, 3, 5, and 7.

FIG. 8 is a diagram of an illustrative programmable (i.e., configurable) logic integrated circuit (IC) 10 that may include any of the circuitry shown in FIGS. 1, 3, 5, and 7 herein. As shown in FIG. 8, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. Programmable logic circuitry 18 may be configured to perform custom logic functions. Programmable logic circuitry 18 may, for example, include the temperature control and mitigation system 500 of FIG. 5 or the core logic region 701 of FIG. 7.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of field-effect transistors. In the context of programmable logic integrated circuits, the memory elements 20 store configuration data and are sometimes referred to as configuration random-access memory (CRAM) cells.

In general, software and data for performing any of the functions disclosed herein may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

The following are additional examples. Example 1 is an integrated circuit system comprising: a temperature sensor circuit that generates an output indicative of a temperature in an integrated circuit in the integrated circuit system; a temperature management controller circuit that compares the temperature indicated by the output of the temperature sensor circuit to a temperature threshold; and temperature reduction circuitry that controls the temperature in the integrated circuit, wherein the temperature management controller circuit causes the temperature reduction circuitry to reduce the temperature in response to the temperature indicated by the output of the temperature sensor circuit exceeding the temperature threshold.

In Example 2, the integrated circuit system of Example 1 may optionally include, wherein the temperature sensor circuit comprises a frequency counter circuit that generates a count value in response to a periodic signal and a comparator circuit that compares the count value with predetermined values corresponding to temperatures to generate the output indicative of the temperature.

In Example 3, the integrated circuit system of any one of Examples 1-2 may optionally include, wherein the temperature sensor circuit comprises programmable logic circuits, and wherein the temperature management controller circuit causes the temperature reduction circuitry to reduce voltage drop at a location in a critical timing path in response to the temperature indicated by the output of the temperature sensor circuit being less than the temperature threshold.

In Example 4, the integrated circuit system of any one of Examples 1-3 may optionally include, wherein the temperature sensor circuit comprises non-programmable logic circuits.

In Example 5, the integrated circuit system of any one of Examples 1~4 may optionally include, wherein the temperature sensor circuit detects performance changes in the integrated circuit system to determine a change in the temperature.

In Example 6, the integrated circuit system of any one of Examples 1-5 may optionally include, wherein the temperature sensor circuit causes the output to be indicative of a hotspot in the integrated circuit in response to detecting a frequency that exceeds a frequency threshold.

In Example 7, the integrated circuit system of any one of Examples 1-6 may optionally include, wherein the temperature reduction circuitry comprises a clock switch-over circuit, and wherein the temperature management controller circuit causes the clock switch-over circuit to reduce a frequency of a clock signal in the integrated circuit in response to the temperature indicated by the output of the temperature sensor circuit exceeding the temperature threshold.

In Example 8, the integrated circuit system of any one of Examples 1-7 may optionally include, wherein the temperature reduction circuitry comprises a clock gating circuit, and wherein the temperature management controller circuit causes the clock gating circuit to block a clock signal from being provided to at least one circuit in the integrated circuit in response to the temperature indicated by the output of the temperature sensor circuit exceeding the temperature threshold.

In Example 9, the integrated circuit system of any one of Examples 1-8 may optionally include, wherein the temperature reduction circuitry comprises a power management controller circuit, and wherein the temperature management controller circuit causes the power management controller circuit to reduce power consumption in multiple integrated circuits in the integrated circuit system in response to the temperature indicated by the output of the temperature sensor circuit exceeding the temperature threshold.

Example 10 is a method for controlling a temperature in an integrated circuit, the method comprising: sensing the temperature using a temperature sensor circuit; comparing the temperature indicated by the temperature sensor circuit to a temperature threshold using a temperature management controller circuit; and causing temperature reduction circuitry to reduce the temperature in at least a portion of the integrated circuit in response to the temperature management controller circuit detecting that the temperature has reached the temperature threshold.

In Example 11, the method of Example 10 may optionally include, wherein sensing the temperature using the temperature sensor circuit comprises generating a count value using a frequency counter circuit in response to a reference periodic signal, and comparing the count value generated by the frequency counter circuit to pre-simulated data indicative of multiple temperatures to determine the temperature of a hotspot using a comparator circuit.

In Example 12, the method of any one of Examples 10-11 may optionally include, wherein sensing the temperature using the temperature sensor circuit comprises causing an output of the temperature sensor circuit to be indicative of a hotspot in the integrated circuit in response to detecting a frequency of a signal in the integrated circuit that exceeds a frequency threshold.

In Example 13, the method of any one of Examples 10-12 may optionally include, wherein causing the temperature reduction circuitry to reduce the temperature comprises causing the temperature reduction circuitry to reduce voltage drop at a location in a critical timing path in response to the temperature indicated by the temperature sensor circuit being less than the temperature threshold.

In Example 14, the method of any one of Examples 10-13 may optionally include, wherein causing the temperature reduction circuitry to reduce the temperature comprises reducing a frequency of a clock signal in the integrated circuit using a clock switch-over circuit in response to the temperature indicated by the temperature sensor circuit reaching the temperature threshold.

In Example 15, the method of any one of Examples 10-14 may optionally include, wherein causing the temperature reduction circuitry to reduce the temperature comprises blocking a clock signal from being provided to at least one circuit in the integrated circuit using a clock gating circuit in response to the temperature indicated by the temperature sensor circuit reaching the temperature threshold.

In Example 16, the method of any one of Examples 10-15 may optionally include, wherein causing the temperature reduction circuitry to reduce the temperature comprises reducing utilization of logic circuitry in the integrated circuit in response to the temperature indicated by the temperature sensor circuit reaching the temperature threshold.

Example 17 is a non-transitory computer readable storage medium comprising instructions stored thereon for causing a computer to execute a method for generating a circuit design for an integrated circuit using a circuit design tool, the method comprising: performing compilation and simulation of the circuit design for the integrated circuit using the circuit design tool; calculating energy consumption in regions of the circuit design using the circuit design tool; identifying hotspots in the circuit design using the circuit design tool based on the energy consumption in the regions of the circuit design; and placing temperature sensor circuits in the regions of the circuit design identified as the hotspots.

In Example 18, the non-transitory computer readable storage medium of Example 17 may optionally include, wherein the method further comprises: assigning input signals or output signals to selected external terminals of the integrated circuit to reduce a temperature of at least one of the hotspots in response to an output of one of the temperature sensor circuits.

In Example 19, the non-transitory computer readable storage medium of any one of Examples 17-18 may optionally include, wherein the method further comprises: reducing a frequency of a clock signal in the integrated circuit using a clock switch-over circuit to reduce a temperature of at least one of the hotspots in response to an output of one of the temperature sensor circuits.

In Example 20, the non-transitory computer readable storage medium of any one of Examples 17-19 may optionally include, wherein identifying the hotspots in the circuit design comprises identifying the hotspots based on definitions of the hotspots, and wherein the method further comprises: generating a new compilation of the circuit design for the integrated circuit that reduces a temperature of at least one of the hotspots by relocating logic and resource allocation away from high temperature regions of the circuit design to lower temperature regions of the circuit design.

It will be recognized by one skilled in the art, that the examples disclosed herein may be practiced without some or all of these specific details. In other instances, well-known operations have not been described in detail in order not to obscure the present examples. It should be appreciated that the examples disclosed herein can be implemented in numerous ways, such as a process, an apparatus, a system, a device, or a method on a computer readable medium.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. An integrated circuit system comprising:

a temperature sensor circuit that generates an output indicative of a temperature in a programmable integrated circuit in the integrated circuit system, wherein the temperature sensor circuit comprises a frequency counter circuit that generates a count value in response to a periodic signal and a comparator circuit that compares the count value with values corresponding to temperatures to generate the output indicative of the temperature, wherein the temperature sensor circuit is placed in a sub-region of a core region of the programmable integrated circuit that is identified as a hotspot based on energy consumption of the sub-region;

a temperature management controller circuit that compares the temperature indicated by the output of the temperature sensor circuit to a temperature threshold to identify the hotspot in the programmable integrated circuit; and temperature reduction circuitry that controls the temperature in the programmable integrated circuit, wherein the temperature management controller circuit causes the temperature reduction circuitry to reduce the temperature in response to the temperature indicated by the output of the temperature sensor circuit exceeding the temperature threshold.

2. The integrated circuit system of claim 1, wherein the temperature sensor circuit comprises programmable logic circuits.

3. The integrated circuit system of claim 1, wherein the temperature management controller circuit causes the temperature reduction circuitry to reduce voltage drop at a location in a critical timing path in response to the temperature indicated by the output of the temperature sensor circuit being less than the temperature threshold.

4. The integrated circuit system of claim 1, wherein the temperature sensor circuit comprises non-programmable logic circuits.

5. The integrated circuit system of claim 1, wherein the temperature sensor circuit detects performance changes in the integrated circuit system to determine a change in the temperature.

6. The integrated circuit system of claim 1, wherein the temperature sensor circuit causes the output to be indicative of the hotspot in the programmable integrated circuit in response to detecting a frequency that exceeds a frequency threshold.

7. The integrated circuit system of claim 1, wherein the temperature reduction circuitry comprises a clock switch-over circuit, and wherein the temperature management controller circuit causes the clock switch-over circuit to reduce a frequency of a clock signal in the programmable integrated circuit in response to the temperature indicated by the output of the temperature sensor circuit exceeding the temperature threshold.

8. The integrated circuit system of claim 1, wherein the temperature reduction circuitry comprises a clock gating circuit, and wherein the temperature management controller circuit causes the clock gating circuit to block a clock signal from being provided to at least one circuit in the programmable integrated circuit in response to the temperature indicated by the output of the temperature sensor circuit exceeding the temperature threshold.

9. The integrated circuit system of claim 1, wherein the temperature reduction circuitry comprises a power management controller circuit, and wherein the temperature management controller circuit causes the power management controller circuit to reduce power consumption in multiple integrated circuits in the integrated circuit system in response to the temperature indicated by the output of the temperature sensor circuit exceeding the temperature threshold.

10. A method for controlling a temperature in a programmable integrated circuit, the method comprising:

placing a temperature sensor circuit in a sub-region of a core region of the programmable integrated circuit that is identified as a hotspot based on energy consumption of the sub-region;

sensing the temperature using the temperature sensor circuit by generating a count value using a frequency counter circuit in response to a reference periodic signal and comparing the count value generated by the frequency counter circuit to data indicative of multiple temperatures to determine the temperature of the hotspot using a comparator circuit;

comparing the temperature indicated by the temperature sensor circuit to a temperature threshold using a temperature management controller circuit; and causing temperature reduction circuitry to reduce the temperature in at least a portion of the programmable integrated circuit in response to the temperature management controller circuit detecting that the temperature has reached the temperature threshold.

11. The method of claim 10, wherein the data is presimulated data.

12. The method of claim 10, wherein sensing the temperature using the temperature sensor circuit comprises causing an output of the temperature sensor circuit to be indicative of the hotspot in the programmable integrated circuit in response to detecting a frequency of a signal in the programmable integrated circuit that exceeds a frequency threshold.

13. The method of claim 10, wherein causing the temperature reduction circuitry to reduce the temperature comprises causing the temperature reduction circuitry to reduce voltage drop at a location in a critical timing path in response to the temperature indicated by the temperature sensor circuit being less than the temperature threshold.

14. The method of claim 10, wherein causing the temperature reduction circuitry to reduce the temperature comprises reducing a frequency of a clock signal in the programmable integrated circuit using a clock switch-over circuit in response to the temperature indicated by the temperature sensor circuit reaching the temperature threshold.

15. The method of claim 10, wherein causing the temperature reduction circuitry to reduce the temperature comprises blocking a clock signal from being provided to at least one circuit in the programmable integrated circuit using a clock gating circuit in response to the temperature indicated by the temperature sensor circuit reaching the temperature threshold.

16. The method of claim 10, wherein causing the temperature reduction circuitry to reduce the temperature comprises reducing utilization of logic circuitry in the programmable integrated circuit in response to the temperature indicated by the temperature sensor circuit reaching the temperature threshold.

17. The method of claim 10 further comprising:

detecting performance changes in the programmable integrated circuit to determine a change in the temperature using the temperature sensor circuit.

18. The method of claim 10 further comprising:

reducing power consumption in multiple integrated circuits that comprise the programmable integrated circuit using a power management controller circuit in the temperature reduction circuitry in response to the temperature indicated by the temperature sensor circuit exceeding the temperature threshold.

19. The method of claim 10, wherein the temperature sensor circuit comprises programmable logic circuits.

20. The method of claim 10, wherein the temperature sensor circuit comprises non-programmable logic circuits.

* * * * *